April 30, 1963  G. H. ANDERSON  3,087,258
TOY ARITHMETICAL ANSWERING DEVICE
Filed March 8, 1962  3 Sheets-Sheet 1

INVENTOR
Gordon H. Anderson

BY Wilkinson, Mawhinney & Theibault
ATTORNEYS

April 30, 1963  G. H. ANDERSON  3,087,258
TOY ARITHMETICAL ANSWERING DEVICE
Filed March 8, 1962  3 Sheets-Sheet 2

INVENTOR
Gordon H. Anderson

BY Wilkinson, Mawhinney & Theibault
ATTORNEYS

April 30, 1963  G. H. ANDERSON  3,087,258
TOY ARITHMETICAL ANSWERING DEVICE
Filed March 8, 1962  3 Sheets-Sheet 3

INVENTOR
Gordon H. Anderson

BY Wilkinson, Mawhinney & Theibault
ATTORNEYS

United States Patent Office 3,087,258
Patented Apr. 30, 1963

3,087,258
TOY ARITHMETICAL ANSWERING DEVICE
Gordon H. Anderson, 1725 Via Estudillo,
Palos Verdes Estates, Calif.
Filed Mar. 8, 1962, Ser. No. 178,462
14 Claims. (Cl. 35—31)

The present invention relates to a toy arithmetical answering device, and has for an object to provide a device for supplying the answers to problems in arithmetic such as quotients in division, products in multiplication, remainders or differences in subtraction, and sums in addition.

Another object of the invention is to provide an arithmetical answering device for use in teaching the processes of arithmetic to young children and to this end there is incorporated into the device toy features whereby the device supplies an interesting factor to pupils as well as an educational element whereby the child will incidentally acquire a knowledge of rudimentary arithmetic in the process of being amused.

A further object of the invention is to provide a device for supplying the answers to any one or more of such arithmetical processes as addition, subtraction, multiplication and division in which the device operates upon a novel mechanical principle which will thus instill into the child an initiation into the processes of physics and mechanics, such process involving the law of gravity, equilibrium, pendulum action, rotary and other motions, and other principles which will appear on further description of the invention.

A still further object of the invention is to provide an attractive, small, lightweight, inexpensive device easily operable and well adapted for classroom or private instruction.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, A designates an appropriate base of any configuration desired and B and C respectively represent aft and forward standards or supports erected in spaced relation upon the base A.

Associated with the forward support C is a front wall D having in a substantially central position a slot E elongated in a vertical direction.

This front wall D also has one or more windows therein for establishing fixed reference members to bring numerical answers on discs to a reading locus. The single form of the invention illustrated embodies four windows F, G, H and I.

Associated with the window F may be the abbreviation Div. meaning the process of arithmetical division. The window will therefore show quotient figures inscribed on the disc or discs hereinafter referred to.

Below or associated with the window G is the abbreviation Mul. to indicate multiplication and that product numerals on a disc will show through this window G.

Associated with the window H is the abbreviation Sub. indicating the process of subtraction and that the window will show difference or remainder numerals.

Associated with the window I is the abbreviation Add. to represent the process of arithmetical addition and that sum figures from a disc will be revealed through this window I.

A shaft J is adapted to be mounted in bearings in the after standard B and in the vertical slot E of the front wall D. Affixed to this shaft J is a reel or drum K of a polygonal general form in which peripheral segments of the reel are indicated at $k$. These segments are plotted on chord lines of the circle of the reel K, the subtended arcs being removed to leave the flat segmental faces $k$ free for the application thereto of a series of numerals.

In the single form of the invention shown these numerals progress arithmetically from 2 to 12 but it will be understood that the number of segments on the reel K may be varied.

The reel K is of generally polygonal form. The numbers on the reel segments $k$ may be denominated for convenience as problem numbers.

The reel may be constructed for convenience of a forward face $k^1$ and an aft face $k^2$, such faces being spaced apart and secured in any suitable manner to the peripheral segmental part $k$ of the reel. In the reel segments are plug holes $k^3$ and within the peripheral portion of the reel is a metal liner or sleeve $k^4$ which is made of magnetic armature material. One or more locking pins $k^5$, $k^6$ may be mounted in the reel preferably in the aft face $k^2$ though projecting through the forward face $k^1$ and being eccentric or off-center with respect to the rotation axis of the reel K.

Figure 1:
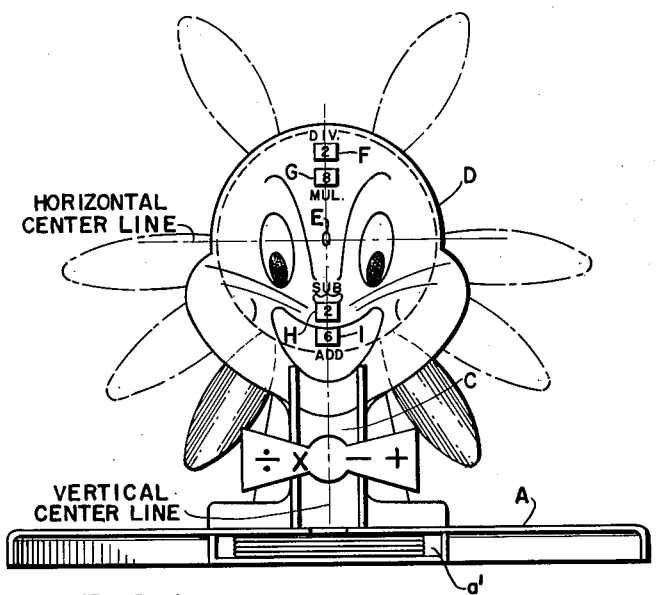
FIGURE 1 is a front elevational view of one form of a toy arithmetical answering device constructed in accordance with the invention.
Figure 3:
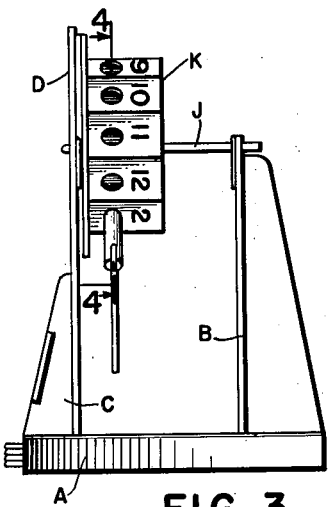
FIGURE 3 is an end elevational view taken from the right-hand end of FIGURES 1 and 2.
Figure 2:
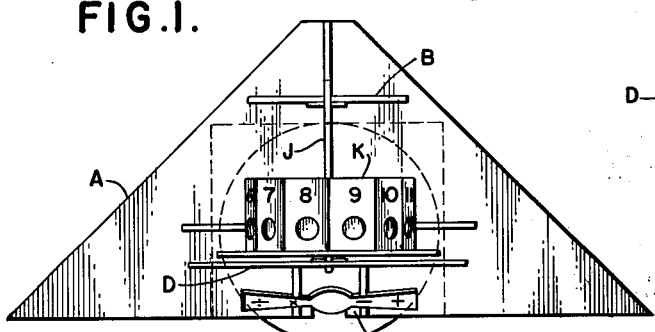
FIGURE 2 is a top plan view of the same.
Figure 6:
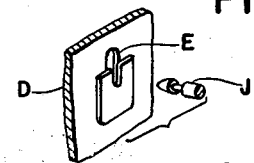
FIGURE 6 is a fragmentary isometric view showing the relationship between the slotted portion of the front wall and the shaft or reel spindle.
Figure 5:
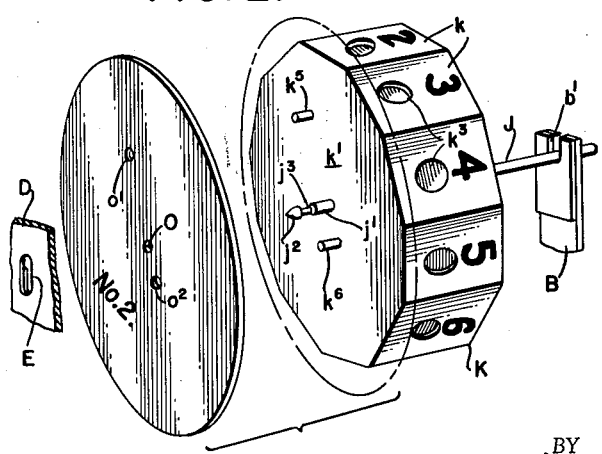
FIGURE 5 is an exploded perspective view of the operative elements of the device.
Figure 4:
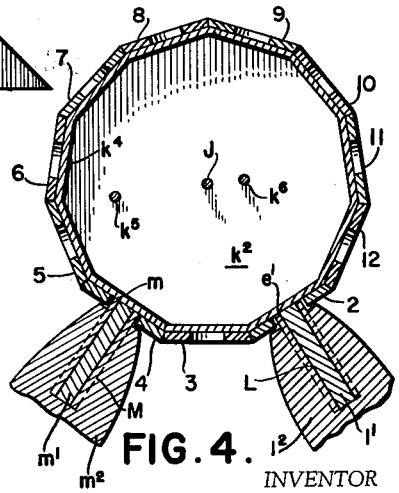
FIGURE 4 is a vertical cross sectional view taken on a magnified scale on the line 4—4 of FIGURE 3.
Figure 7:
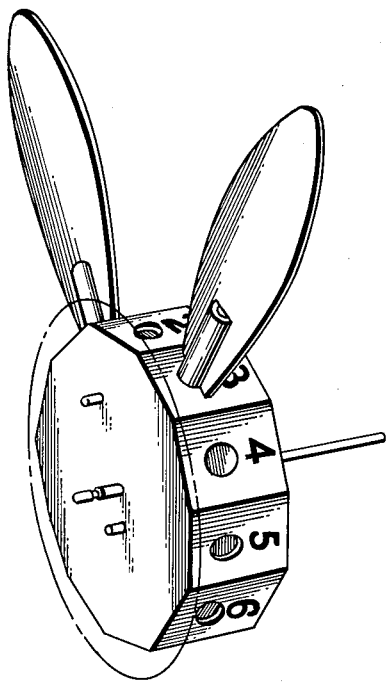
FIGURE 7 is a perspective view of the reel, its shaft and showing the application of the weights thereto.
Figure 15:
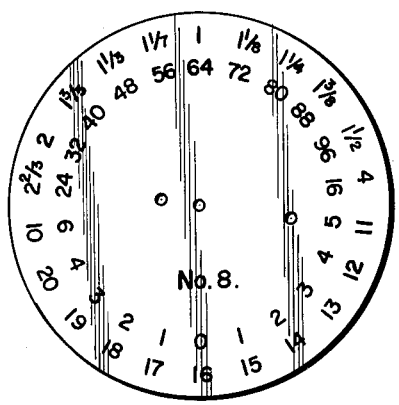
FIGURES 15 and 16 are obverse and reverse faces of a disc designated with the key numbers "No. 8" and "No. 9" bearing tables of a further and higher progression.
Figure 16:
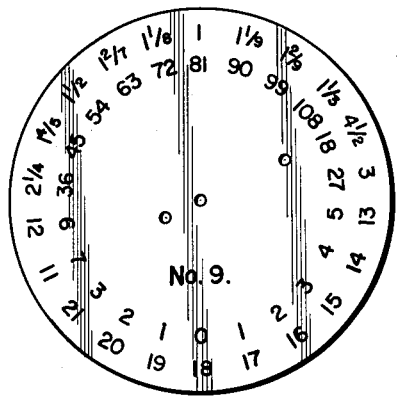

As shown in FIGURE 5 the shaft J has a bearing surface $j^1$ extending forwardly of the forward face $k^1$. Forwardly of this bearing surface is a point or bevelled forward end $j^2$ of the shaft.

Between the bearing surface $j^1$ and the pointed forward end $j^2$ is an annular notch or groove $j^3$ having forward and rear walls normal to the axis of the shaft.

The bearing surface $j^1$ is adapted to receive the center holes O in the discs which are shown in FIGURES 5 and 8 to 16 inclusive, such discs bearing key numbers for instance, "No. 2," "No. 3," "No. 4," etc.

As shown more particularly in FIGURE 5 the discs also have one or more eccentric holes $o^1$ and $o^2$ for fitting over the forwardly projecting portions of the locking pins $k^5$ and $k^6$ whereby to entrain the discs for rotation with the reel K whereby the grooved portions $j^3$ of the shaft extending forwardly of the discs for entry into the slot E in the front wall D whereby the reduced section formed by the annular notch $j^3$ will enable the forward end of the shaft J to drop to the lower portion of the slot E with the front and rear straight walls of the notch $j^3$ abutting front and rear faces of the front wall D whereby to prevent casual or accidental axial movement of the shaft J in the bearings which are provided by the front wall D and the rear support B.

As shown in FIGURE 5, the rear shaft bearing $b^1$ in the aft support B is open at its upper end for the lift release of the shaft from the bearing required in the act of changing discs.

Weights L and M are provided for causing rotation or angular movement of the reel K. These weights have plug ends $l$ and $m$ adapted to be plugged into the plug holes $k^3$ in the reel segments in which they may be frictionally held, if desired, without the use of the magnetic arrangement. Or these weights may be detachably connectible to the face segments $k$ of the reel in any suitable manner.

In the one form of invention illustrated the plug ends $l$ and $m$ embody permanent bar magnets $l^1$ and $m^1$ whereby on application to the holes $k^3$ the magnets will be attached to the armature and thus detachably hold the weights to the reel in selected positions for influencing the rotation of angular movement of the reel by virtue of the pendulum action of the weights incident to the force of gravity in seeking a low level.

The weights may be pulled away from the reel with slight exertion for application to other segments.

If desired, the front wall D may be represented in one more caricatures or fanciful shapes attractive to children. In the form of invention illustrated, the front wall is in the caricature of the face of a rabbit while handle members $l^2$ and $m^2$ are in the shape of rabbit ears.

The various members of the device may be displayed in contrasting attractive colors.

In the base A is conveniently provided a stowage space $a^1$ for the discs which contain tables of numerical answers to the several arithmetical problems and accordingly these discs have been called in the claims "answer members."

Figure 8:
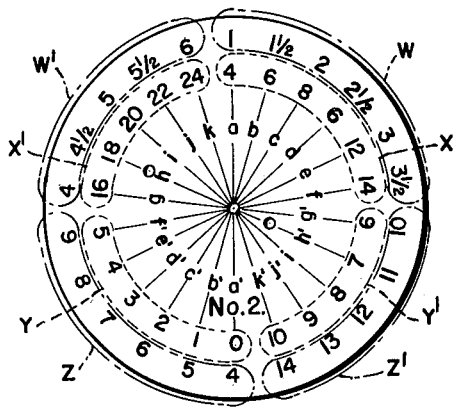
FIGURE 8 is a plan view of a form of disc which may be employed in conjunction with the invention bearing tabular matter indexed pursuant to the key number "No. 2" borne by the disc, such figure having applied thereto, for purposes of explanation and understanding, certain radial lines, enclosing loops and reference letters which however do not appear upon the disc as actually used.

In FIGURE 8, disc No. 2 is illustrated in which for purposes of description, explanation and understanding, this disc or disc face No. 2 is inscribed with various radial or diametric lines indicating letters and loops about the various scales or numerical answering tables.

For instance, a division or quotient table is shown as comprising two sections $w$ and $w^1$. These numbers progress by whole and mixed numbers in section $w$ from 1 to 3½ and in the second section from 4 to 6. The numerical progression of both tables $w$ and $w^1$ is from left to right in an arcuate or concentric arrangement at the outer edge of the disc. Therefore in bringing the numerical answer numbers of the division table section $w$ back of the window F, the disc must be moved step by step in a counterclockwise direction.

Likewise, the disc will have to be moved counterclockwise progressively to bring the numerals of the second section $w^1$ to the locus sight window F.

In progressing from the numeral 3½ at the end of table section $w$ to the numeral 4 at the beginning of table section $w^1$, it is necessary to re-orient the disc by an angular movement of approximately 180° or a half rotation, this being caused by the weights rising above the horizontal line and therefore together acting to rotate the reel around to a position where the handles will then be diverging downwardly.

In like manner, the multiplication or product table is divided into sections $x$ and $x^1$ which are concentric with table sections $w$ and $w^1$ respectively.

The subtraction or difference table sections $y$ and $y^1$ are respectively concentric with table sections $w$ and $x$ and $w^1$ and $x^1$ respectively.

In like manner the addition or sum table sections $z$ and $z^1$ are concentric with the sections $y$ and $y^1$.

The table sections $y$ and $y^1$ and $z$ and $z^1$ are at the lower half of disc No. 2 and the table sections $w$ and $w^1$ and $x$ and $x^1$ are in the upper half of the disc.

Thus, it will be seen that answer numbers from all four tables may be simultaneously exposed in the four windows F, G, H and I in the order shown by the diametric lines drawn on disc No. 2 in FIGURE 8.

These diametric lines show that the answering numerals in line therewith are simultaneously exposed at all four windows. These diametric lines are split up into their radial components and are marked $a$, $b$, $c$, $d$, $e$ and $f$ for scale sections $w$ and $x$ of the upper half of the disc and $a^1$, $b^1$, $c^1$, $d^1$, $e^1$ and $f^1$ for the scale sections $y$ and $z$ of the lower portion of the disc.

These radial lines are lettered $g$, $h$, $i$, $j$ and $k$ for the upper half scale sections $w^1$ and $x^1$ and $g^1$, $h^1$, $i^1$, $j^1$ and $k^1$ for the lower scale sections $y^1$ and $z^1$.

Figure 9:
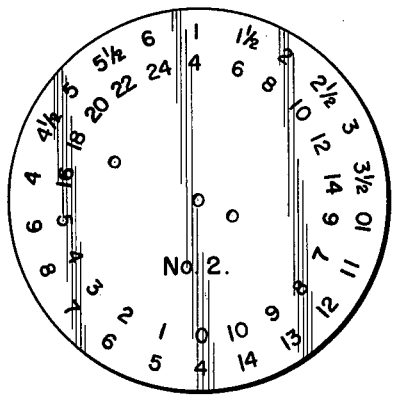
FIGURE 9 shows a plan view of disc "No. 2" as actually used without the information and clarifying addenda supplied for purposes of description to FIGURE 8.

FIGURE 9 shows disc No. 2 as it actually appears in practice without the identifying data just referred to in describing FIGURE 8.

The scales or tables plotted for disc No. 2 are in reference to the reel segment denominated "2" and in the use of disc No. 2, it is necessary to place one of the weights in the hole of segment 2. This one weight is sufficient alone for dropping to a plumb line and thus rotating the reel and the entrained disc No. 2 around to a position where the numerals on radial lines $a$ and $a^1$ will appear at the four windows which show 1
4
0
4 meaning that by virtue of the plotting of the tables of disc No. 2 in relation to segment 2, which relationship is compelled by the locking pins $k^5$ and $k^6$, 2 divided by 2 equals 1
2 multiplied by 2 equal 4
2 minus 2 equals 0
2 plus 2 equals 4

When the second weight is added in reel segment 3 the disc and reel will be displaced angularly to the position of radial lines $b$ and $b^1$ by which the two weights which are of equal mass will act conjointly to move the disc to the indicated position, each weight being displaced from the vertical line of the device an equal distance.

One weight is always maintained in segment 2 of the reel when disc No. 2 is being used, this number 2 on the disc being the key number to indicate the plotting of the tables with reference to this number.

When a second weight is placed in any one of the other segments, 3 to 12, the action of one weight will modify that of the other in reference to the gravity movement of the weights and the consequent angular movement of the reel and disc and thus the disc will be proportionately rotated to expose at the windows the correct answers to problems raised by the problem numbers on the reel. When the second weight is in the hole of segment 3 of the reel the division problem of 3 divided by 2 is shown to be 1½ the product of 2 times 3 is shown at window G as 6, the subtraction of 2 from 3 is shown at window H as 1 and the addition of 2 and 3 is shown at window I as 5.

By removing the second weight from the segment 3 and placing it in any other segment progressively or at random in all of the other holes of all the other reel segments, disc No. 2 will be brought to all of the angular positions indicated by the letters $a$ to $k$ and $a^1$ to $k^1$ thus encompassing all of the tubular material on the disc No. 2.

Figure 10:
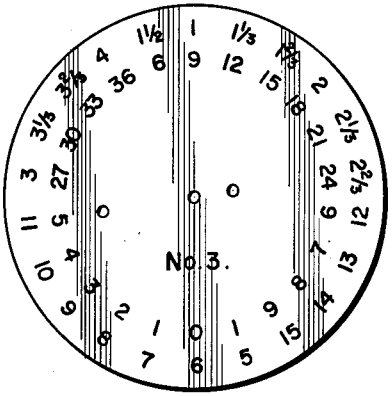
FIGURE 10 is a plan view of the reverse face of disc "No. 2" bearing the key number "No. 3" upon which are inscribed different tables of numerals supplying answers to different mathematical problems occasional by the use of different segments of the reel shown in FIGURES 4 and 7.

In like manner, disc No. 2 may be reversed and on its reverse face as shown in FIGURE 10, is a key number No. 3 which requires that one of the weights be applied to the reel segment 3. Thereupon the other weight may be applied to other segments of the reel consecutively or otherwise and the tables of disc No. 3 are so plotted that the answers to the division of 3 into any other number on the reel or the multiplication of 3 by any other number on the reel and the subtraction of 3 from any other number on the reel and the addition of 3 to any other number on the reel will be given in correct answers at the windows labelled by the abbreviations of these various processes of arithmetical procedures.

Figure 11:
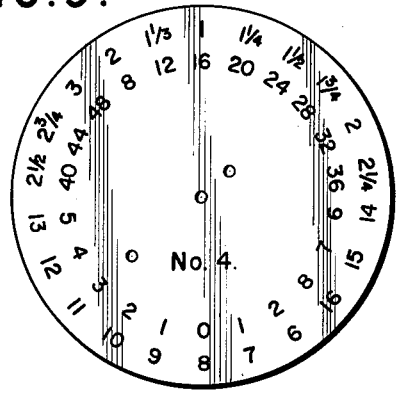
FIGURES 11 and 12 are respectively obverse and reverse faces of a disc denominated "No. 4" and "No. 5" bearing thereon different tables of numbers cooperating with other reel segments.
Figure 12:
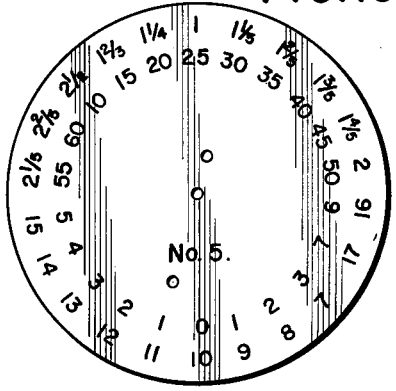
Figure 13:
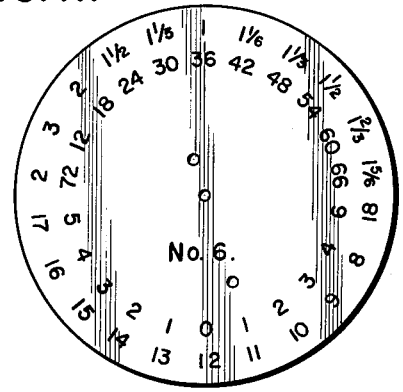
FIGURES 13 and 14 are plan views of the obverse and reverse faces "No. 6" and "No. 7" of a further disc having further progressive tables thereon.
Figure 14:
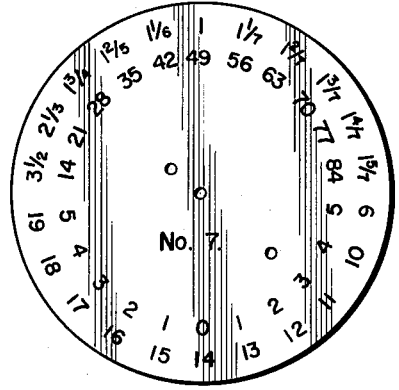

FIGURES 11 and 12 show opposite sides of discs having key numbers 4 and 5 and FIGURES 13 and 14 and 15 and 16 show discs having key numbers No. 6, No. 7, No. 8 and No. 9, all plotted with tables of answers to these arithmetical processes related in the manner heretofore indicated to the key numbers of the discs.

By lifting the shaft J out of the rear bearing and upwardly in the vertical groove E of the front wall D, the front portion of the shaft together with the reel and disc may be withdrawn from the front wall and lifted out from between the fore and aft supports for accessibility to the disc for removal from the reel and the replacement of other discs.

While the face of the device is painted to resemble a rabbit, it will be understood that other animated figures may be represented.

The locking pins $k^5$ and $k^6$ serve two functions. They orient the plotted scales of the discs to key numbers on the discs and on the reel and in the second place, these locking pins exert side loads against the inside surfaces of the holes $o^1$ and $o^2$ of the discs thus compelling rotation of the discs with the reel for perfect alignment of the tabular matter on the discs with the windows of the front wall.

Because of gravity there is a tendency for the weights to rotate the reel to a position where the weights are below the horizontal center line of the front face. The degree of rotation depends upon the point of contact of the weights in the numbered holes of the reel. The weights will rotate when released until they reach an equilibrium about the vertical center line of the front face. This permits a predetermined index reading through the front face windows from the numbered discs giving the proper answers to the selection that was made with weights on the reel.

One weight represents one selected numbered disc and is always left on an equivalent numbered segment on the reel. This selected number is to be added, subtracted, multiplied or divided by the remainder of numbers on the reel segments.

The selection of the remainder of numbers on the reel is made by the other weight. The answers to these two selected numbers are given at the windows in front.

Although I have disclosed herein the best form of the invention known to me at this time, I reserve the right to all such modifications and changes as may come within the scope of the following claims.

What is claimed is:

1. A toy arithmetical answering device comprising
    (a) at least one answer member bearing a key number and numerical answers to arithmetic problems,
    (b) a rotary problem member having segments on which are inscribed problem numbers, one at least of which is the key number of the answer member,
    (c) attaching means for entraining the answer member to rotate with the problem member only when applied to the problem member in an angular relationship in which the answers on the answer member correspond to problem numbers on the problem member,
    (d) a fixed reference member past which the answer member rotates to bring numerical answers to a reading locus, and
    (e) a weight member detachably connectible to the problem member at the segment bearing the key number adapted singly to descend by the force of gravitation and rotatably carry with it the problem member and entrained answer member until the key numbered segment arrives at the lowermost position of rotation at which numerical answers to the key number will appear at the reading locus.

2. A toy arithmetical answering device as claimed in claim 1 further comprising
    (f) a second weight member detachably connectible to the problem member successively at selected other segments to act conjointly with the first-named weight member to influence the problem and answer members to a succession of different angular positions relatively to the reference member whereby at the reading locus there may be read off answers corresponding to the selected attached position of the second weight member to the problem member.

3. A toy arithmetical answering device as claimed in claim 2 in which the fixed reference member
    (g) constitutes a front wall of the device and is in the caricature of a rabbit and
    (h) the weight members have handles in the shape of rabbit ears positioned to radiate beyond edges of the front wall.

4. A toy arithmetical answering device as claimed in claim 1 in which
    (f) the numerical answers are inscribed in tabular form concentrically on the answer member.

5. A toy arithmetical answering device as claimed in claim 4 in which
    (g) the concentric answer tables are divided into sections with the answer numbers in such section progressing in an order for anticlockwise rotation of the answer member.

6. A toy arithmetical answering device as claimed in claim 1 in which the answer member
    (f) has also a reverse face bearing a different key number and accordingly a different set of numerical answers.

7. A toy arithmetical answering device as claimed in claim 1 in which the answer member
    (f) is a disc.

8. A toy arithmetical answering device as claimed in claim 1 in which the rotary member
    (f) is a reel and the segments
    (g) are peripheral chord faces of the reel.

9. A toy arithmetical answering device as claimed in claim 1 in which the attaching means comprises
    (f) at least one eccentric projection on the problem member,
    (g) said answer member having a hole off-center thereof, adapted to fit the projection for orienting the numerical answers to correct relative position with the problem numbers of the problem member.

10. A toy arithmetical answering device as claimed in claim 1 in which said fixed reference member
    (f) is a front wall of the device having windows as reading loci.

11. A toy arithmetical answering device as claimed in claim 1 in which the detachable connection comprises
    (f) a magnetic armature member on the rotary problem member, and
    (g) a magnet on the weight member.

12. A toy arithmetical answering device as claimed in claim 1 in which the rotary problem member
    (f) has holes in the segments thereof, (g) a metal armature magnetic lining within the segments exposed through the holes, (h) a plug member associated with the weight member for entering the holes, and (i) a permanent magnet carried by the plug member.

13. A toy arithmetical answering device as claimed in claim 1 further comprising (f) a shaft supporting the problem and answer members, (g) means for detachably and rotatably receiving and supporting the shaft, and (h) means for retaining the shaft against axial movement.

14. A toy arithmetical answering device comprising (a) a base, (b) spaced forward and aft supports erected on the base, (c) a bearing on the aft support having an open upper end, (d) a front wall on the forward support having a vertical elongated central slot, (e) a shaft removably mounted in the aft support bearing and in and through the elongated slot, (f) said shaft having an annular groove near its forward end received in the lower edge of the slot to arrest endwise movement of the shaft, (g) a reel fixed to the shaft having peripheral segmental portions numbered consecutively and having holes therein, (h) a magnetic armature member in the reel exposed through the holes, (i) a plurality of discs having key members thereon and answering tables, (j) said discs having central openings receivable demountably over the front portion of the shaft and against the reel, (k) means between the reel and discs for entraining the discs to rotate with the reel and to locate the discs in specified angular orientation with respect to the numbered segments of the reel, and (l) magnetic plug weights detachably applicable through the holes and attracted to the armature member for removably attaching the weights to the reel and rotating the reel to bring tabular numbers of the discs into angular positions related to the front wall, (m) said front wall having windows therein through which tabular matter on the discs may be read.

References Cited in the file of this patent

UNITED STATES PATENTS

| | | |
|---|---|---|
| 584,219 | De Grain | June 8, 1897 |
| 1,519,426 | Walker | Dec. 16, 1924 |
| 2,965,980 | Day | Dec. 27, 1960 |
| 3,011,270 | Hosbach | Dec. 5, 1961 |
| 3,024,540 | Orth | Mar. 13, 1962 |